Patented July 26, 1949

2,477,091

UNITED STATES PATENT OFFICE 2,477,091

ALKYLATION OF PHENOLS

Robert H. Rosenwald, Western Springs, Ill., assignor to Universal Oil Products Company, Chicago, Ill., a corporation of Delaware No Drawing. Application April 16, 1947,
Serial No. 741,943

14 Claims. (Cl. 260—612)

This invention relates to the reaction of a phenolic compound with an alkylating agent. It is more particularly concerned with the O-alkylation of phenolic compounds by a method which comprises reacting a phenol with an alkylating agent at certain temperature conditions in the presence of a carboxylic acid alkylation catalyst.

A number of efficient processes for the nuclear alkylation of aromatic compounds containing a hydroxyl group are known to those skilled in the art. However, it frequently is desirable to O-alkylate compounds of this type in order to produce aromatic ethers for use in the preparation of inhibitors and the like. I have discovered an efficient method of accomplishing this result.

In one embodiment my invention relates to an O-alkylation process which comprises contacting a phenolic compound with an alkylating agent at an alkylating temperature below about 150° C. in the presence of a carboxylic acid alkylation catalyst.

In a more specific embodiment my invention relates to an O-alkylation process which comprises contacting a phenolic compound with an alkylating agent at an alkylating temperature below about 150° C. in the presence of a chloroacetic acid alkylation catalyst.

In another specific embodiment my invention relates to an O-alkylation process which comprises contacting a phenolic compound with an alkylating agent at an alkylating temperature below about 150° C. in the presence of a nitrobenzoic acid alkylation catalyst.

Phenolic compounds that may be reacted with alkylating agents in accordance with the process of this invention include materials such as phenol, hydroquinone, catechol, hydroxyquinol, guaiacol, para-methoxyphenol, para-ethoxyphenol, 2-tertiary butyl-4-methoxyphenol, cresol, and the like.

The alkylating agents utilizable in this process include substances capable of yielding an alkyl group at the conditions of operation employed in the process. Examples of such substances are olefins, both normally gaseous and normally liquid, cycloparaffins containing less than 5 carbon atoms in the ring, mercaptans, mineral acid esters such as alkyl halides and alkoxy compounds of the class consisting of aliphatic alcohols, ethers, and esters of carboxylic acids. In general olefins and alcohols are the most useful alkylating agents in my process. Ethylene is difficultly reactable with phenols and for this reason its use is limited.

The catalysts that may be used in this process consist of carboxylic acids that promote the O-alkylation of phenols. Such catalysts include mono-, di-, and trichloroacetic acids, mono-, di-, and tribromoacetic acids, mono-, di-, and trinitrobenzoic acids, oxalic acid, formic acid, propionic acid, and the like.

The process of my invention may be carried out in batch operation by placing a quantity of the catalyst in a reactor equipped with a stirring device, adding the phenolic compound, heating or cooling to the reaction temperature, slowly adding the alkylating agent while mixing the contents of the reactor, and recovering the product. However, the preferred method of operation is of the continuous type. In one mode of continuous operation, the catalyst is continuously charged to a reactor together with a phenol and the alkylating agent. The reactor effluent is continuously passed to a separation zone wherein the products are recovered from the unconverted reactants and the catalyst.

The process of this invention is conducted at temperatures below about 150° C. Above this temperature, substantially no O-alkylation is obtained. The lower temperature limit is governed by the reactivity of the reactants and by the activity of the catalyst. Usually the reaction is too slow to be economically feasible if the temperature is below about —20° C.

Although some reaction is obtained when the reactants and the catalyst are in the vapor phase, better results are obtained when they are in the liquid phase. Consequently, the pressure will be chosen accordingly.

The contact time may be in the range of from about 3 minutes to about 3 hours.

A molecular excess of the phenolic compound over the alkylating agent in the reaction zone promotes reaction between the phenol and the alkylating agent and suppresses undesirable side reactions.

The following examples are given to illustrate my invention but they are not introduced with the intention of unduly limiting the generally broad scope of said invention.

Examples

In each of the following experiments the catalyst, phenol, and olefin were placed in an autoclave which was then heated to and maintained at the reaction temperature for several hours while the autoclave was rotated. After this the autoclave was cooled and the material contained therein was removed and extracted with caustic to separate the unreacted phenol. The remaining product was then analyzed for ethers. The reaction temperature in all of the examples except No. 2 was 75° C.; in Example 2 it was 150° C. The results are shown in the following table:

| Example No. | 1 | 2 | 3 | 4 | 5 | 6 | 7 | 8 | 9 |
|---|---|---|---|---|---|---|---|---|---|
| Alkylatable Compound: | | | | | | | | | |
| Kind | Phenol | Phenol | p-Cresol | 4-Methoxy-Phenol | 2-t-Butyl-4-Methoxy-phenol | 4-t-Butyl-Phenol | Catechol | Phenol | Phenol |
| Grams | 47 | 47 | 54 | 62 | 45 | 75 | 55 | 47 | 47 |
| Isobutylene, grams | 46 | 40 | 40 | 40 | 20 | 35 | 35 | 40 | 40 |
| Catalyst: | | | | | | | | | |
| Kind | | | | Trichloroacetic Acid | | | | Trinitro-benzoic Acid | Oxalic Acid |
| Grams | 6 | 6 | 6 | 6 | 6 | 6 | 6 | 6 | 15 |
| Product: | | | | | | | | | |
| Caustic Insoluble (Ethers) | 22 | 21 [1] | 24 | 20 | 15 | 16 | 10–15 [2] | 25 | 5 |
| Boiling Pt. of Ethers, °C. | 72–74 | | 78–88 | 100–115 | 127–132 | 111–115 | 95–97 | 70–76 | 68–75 |
| Pressure, mm. Hg. | 19 | | 17 | 15 | 12 | 16 | 13 | 18 | 25 |

[1] This product was a tar rather than a simple ether.
[2] This product was caustic soluble, which probably was due to the presence of an hydroxyl group on the nucleus in addition to the butoxy group.

It will be observed that O-alkylation was obtained at 75° C.; whereas at a temperature of 150° C., no simple ethers were produced from phenol and isobutylene when using trichloroacetic acid as the catalyst. No evidence of ring alkylation was observed in any of these experiments.

I claim as my invention:

1. An O-alkylation process which comprises contacting a phenolic compound with an alkylating agent at an alkylating temperature below about 150° C. in the presence of a carboxylic acid alkylation catalyst.

2. An O-alkylation process which comprises contacting a phenolic compound with an alkylating agent at an alkylating temperature below about 150° C., a pressure such that substantially all of the reactants are in the liquid phase, and in the presence of a carboxylic acid alkylation catalyst.

3. The process of claim 2 further characterized in that the alkylating agent is an olefin.

4. The process of claim 3 further characterized in that the olefin contains more than two carbon atoms.

5. An O-alkylation process which comprises contacting a phenolic compound with an alkylating agent at an alkylating temperature below about 150° C. in the presence of a chloroacetic acid alkylation catalyst.

6. An O-alkylation process which comprises contacting a phenolic compound with an alkylating agent at an alkylating temperature below about 150° C., a pressure such that substantially all of the reactants are in the liquid phase, and in the presence of a chloroacetic acid alkylation catalyst.

7. The process of claim 6 further characterized in that the alkylating agent is an olefin.

8. The process of claim 7 further characterized in that the olefin contains more than two carbon atoms.

9. An O-alkylation process which comprises contacting a phenolic compound with an alkylating agent at an alkylating temperature below about 150° C. in the presence of a nitrobenzoic acid alkylation catalyst.

10. An O-alkylation process which comprises contacting a phenolic compound with an alkylating agent at an alkylating temperature below about 150° C., a pressure such that substantially all of the reactants are in the liquid phase, and in the presence of a nitrobenzoic acid alkylation catalyst.

11. The process of claim 10 further characterized in that the alkylating agent is an olefin.

12. The process of claim 11 further characterized in that the olefin contains more than two carbon atoms.

13. An O-alkylation process which comprises contacting a phenolic compound with an alkylating agent at an alkylating temperature below about 150° C. in the presence of trinitrobenzoic acid.

14. An O-alkylation process which comprises contacting a phenolic compound with an alkylating agent at an alkylating temperature below about 150° C. in the presence of trichloroacetic acid.

ROBERT H. ROSENWALD.

REFERENCES CITED

The following references are of record in the file of this patent:

UNITED STATES PATENTS

| Number | Name | Date |
|---|---|---|
| 2,017,355 | Reppe et al. | Oct. 15, 1935 |
| 2,038,947 | Maschmeijer et al. | Apr. 28, 1936 |
| 2,109,340 | Nieuwland et al. | Feb. 22, 1938 |
| 2,147,256 | Ipatieff et al. | Feb. 14, 1939 |

FOREIGN PATENTS

| Number | Country | Date |
|---|---|---|
| 723,377 | France | Jan. 13, 1932 |
| 849,553 | France | Aug. 21, 1939 |